United States Patent
Fischer et al.

(10) Patent No.: US 7,309,032 B2
(45) Date of Patent: Dec. 18, 2007

(54) DOSING DEVICE FOR FLUIDS, ESPECIALLY A MOTOR VEHICLE INJECTION VALVE

(75) Inventors: Bernhard Fischer, Töging A. Inn (DE); Bernhard Gottlieb, München (DE); Andreas Kappel, Brunnthal (DE); Enrico Ulivieri, München (DE)

(73) Assignee: Siemens Aktiengesellschaft, Munich (DE)

( * ) Notice: Subject to any disclaimer, the term of this patent is extended or adjusted under 35 U.S.C. 154(b) by 210 days.

(21) Appl. No.: 10/967,384

(22) Filed: Oct. 18, 2004

(65) Prior Publication Data

US 2005/0103587 A1 May 19, 2005

Related U.S. Application Data

(63) Continuation of application No. PCT/DE03/01092, filed on Apr. 2, 2003.

(30) Foreign Application Priority Data

Apr. 22, 2002 (DE) ............................... 102 17 882

(51) Int. Cl.
*B05B 1/30* (2006.01)
*F02M 51/00* (2006.01)
*F16K 31/02* (2006.01)

(52) U.S. Cl. ............... 239/585.1; 239/102.1; 239/453; 239/533.2; 239/533.8; 251/337; 251/129.06

(58) Field of Classification Search .. 239/585.1–585.5, 239/533.2, 533.4, 533.8, 102.2, 533.7, 453; 251/337, 129.06

See application file for complete search history.

(56) References Cited

U.S. PATENT DOCUMENTS

| | | | |
|---|---|---|---|
| 6,119,952 A * | 9/2000 | Kappel et al. ................ | 239/5 |
| 6,311,950 B1 * | 11/2001 | Kappel et al. ......... | 251/129.06 |
| 6,739,528 B2 * | 5/2004 | Lorraine et al. ......... | 239/585.1 |
| 6,755,353 B2 * | 6/2004 | Lorraine et al. ......... | 239/102.2 |
| 6,948,667 B2 * | 9/2005 | Eichendorf ............... | 239/585.1 |
| 6,962,297 B2 * | 11/2005 | Kienzler et al. .......... | 239/102.2 |
| 6,969,009 B2 * | 11/2005 | Bachmaier et al. ...... | 239/102.2 |
| 7,032,833 B2 * | 4/2006 | Bocking .................. | 239/102.2 |
| 7,044,407 B2 * | 5/2006 | Fischer et al. ........... | 239/533.7 |
| 7,055,765 B2 * | 6/2006 | Liskow .................... | 239/585.1 |
| 7,066,399 B2 * | 6/2006 | Hohl ....................... | 239/102.2 |

FOREIGN PATENT DOCUMENTS

DE 43 06 072 A1 9/1994

(Continued)

*Primary Examiner*—Kevin Shaver
*Assistant Examiner*—James S. Hogan
(74) *Attorney, Agent, or Firm*—Baker Botts L.L.P.

(57) ABSTRACT

An actuator (4) is connected, on one side, to a valve needle (3), and on the opposite side, to a hydraulic piston (6) pertaining to a hydraulic length compensator. A working chamber (5) is divided by a tight separating membrane (9), into an actuator chamber (10) containing the actuator (4) and a fluid chamber (11) which can be filled with the fluid to be dosed in a pressurized manner while the actuator chamber (10) and the hydraulic chamber (7) are filled with a hydraulic fluid. A base pressure can be produced in the hydraulic fluid by means of the pressure of the fluid to be dosed, which is transmitted through the separating membrane (9).

20 Claims, 2 Drawing Sheets

FOREIGN PATENT DOCUMENTS

| | | |
|---|---|---|
| DE | 199 40 056 A1 | 3/2001 |
| DE | 199 40 055 C1 | 4/2001 |
| DE | 199 58 704 C2 | 10/2002 |
| EP | 1 079 098 A2 | 8/2000 |
| EP | 1 111 230 A2 | 12/2000 |
| EP | 1079098 A2 * | 2/2001 |
| EP | 1079098 B1 | 2/2001 |

* cited by examiner

Section A-A

Section B-B

DOSING DEVICE FOR FLUIDS, ESPECIALLY A MOTOR VEHICLE INJECTION VALVE

CROSS REFERENCE TO RELATED APPLICATION

This application is a continuation of copending International Application No. PCT/DE03/01092 filed Apr. 2, 2003 which designates the United States, and claims priority to German application no. 102 17 882.8 filed Apr. 22, 2002.

TECHNICAL FIELD OF THE INVENTION

The present invention relates to a dosing device for dosing a fluid which is under pressure and which is to be dosed. Devices of said type, referred to below also as a dosing or injection valve, have as their main components an electromechanical actuator that drives a valve needle and a hydraulic length compensator, and are used in particular as injection valves for internal combustion engines.

DESCRIPTION OF THE RELATED ART

A device of this type is already known from DE 199 40 056 A1.

Increasing use is being made in motor vehicle technology of injection systems in which fuel under high pressure is applied to injection valves located in the cylinders. The process of injecting directly into the combustion chamber of said cylinders is initiated by opening and closing of the injection valves, with said injection valves being driven via modern actuators which—in order to achieve rapid switching speeds and the known advantages associated therewith in terms of fuel consumption and exhaust gas emissions—operate in particular according to the piezoelectric principle.

With modern solid-state actuators, the axial changes in length resulting in the positioning travel of the valve needle are produced primarily by the short expansion of the actuator body when an excitation voltage is applied. However, other influencing factors, in particular changes in temperature, also cause changes in the actuator's length, although these take place relatively slowly. It is known how to integrate a hydraulic length compensator in the injection valve in order, despite such non-dynamic changes in length, to maintain a constant amount of positioning travel specified for the actuator, and hence a consistent amount of valve needle travel. Said length compensator essentially comprises a hydraulic chamber hydraulically connected in a throttled manner to an equalizing chamber. An expanding piezoelectric actuator causes a hydraulic piston to exert pressure on the hydraulic chamber filled with a working fluid. When expansion is rapid and dynamic, throttling does not allow the pressure or, as the case may be, fluid to be equalized so that the hydraulic piston and actuator are supported on the fluid blanket in the hydraulic chamber; the actuator consequently retains its position relative to the housing when the valve is actuated. When, conversely, expansion is slow, equalizing will take place between the hydraulic chamber and the equalizing chamber until pressure is equal in both chambers and the actuator again has its position retained—with its change in length being compensated—on the housing side. This means that the complete, constant positioning travel will be available again for further, brief valve actuations.

A dosing valve is described in the above-cited DE 199 40 056 A1 whose special features consist on the one hand in locating the hydraulic piston and the hydraulic chamber of the length compensator one behind the other on the actuator's end face opposite the valve needle. The actuator is located inside a working chamber which serves over its entire (axial) length as an equalizing chamber and which can be filled with working fluid. In this arrangement the working chamber can be divided in the axial direction by means of an axial metal bellows into an inner actuator chamber (with actuator, without working fluid) and an outer actuator chamber (in this case: an equalizing chamber with working fluid).

On the other hand, the length compensation system of this known dosing valve is not hydraulically terminated and filled with a special hydraulic fluid as the working fluid. Rather it is the case that the hydraulic chamber can be filled under pressure via the working chamber and the working chamber itself is hydraulically open toward the valve chamber or, as the case may be, toward the feed of the fluid being dosed. The working fluid and the base pressure of the compensation system are therefore provided, respectively, directly by the fluid itself that is being dosed and by its pressure supplied via the fluid feed, in this case, fuel pressure. The hydraulic chamber can consequently be subjected to a high fuel pressure, increasingly being employed, of up to 300 bar, and the actuator subjected to a correspondingly high hydraulic compressive pre-stressing which protects it from harmful tensile stresses during dynamic operation. Thanks to the high pressure, the hydraulic chamber is rendered capable of being filled free of cavitation and furthermore can briefly accommodate very high tensile forces of the kind required for closing the dosing aperture more rapidly.

A non-generic injection valve having a piezoelectric actuator is known from DE 198 38 862 A1, wherein the hydraulic length compensation system is subjected to pressure directly by a base pressure predefined in the system and additionally indirectly using the fuel pressure. The design of the length compensator in that case requires a hydraulic chamber and a hydraulic accumulator (partially providing the functions of an equalizing chamber), both located on the valve needle side outside the space for the actuator and separated from said space. The compensation system is hermetically sealed from the fuel and filled under pressure with a hydraulic fluid which is under a base pressure, typically 25 bar. Toward a fuel-filled fluid chamber the hydraulic accumulator has an at least partially flexible external wall not defined in more detail in terms of type or arrangement. Owing to the flexibility of said at least partially flexible external wall, the fuel pressure being applied to it is additively superimposed on the base pressure in the hydraulic accumulator. The resulting overall pressure is then available in particular for compressive pre-stressing of the actuator. The falling differential pressure between the compensation system and the fuel-filled fluid chamber ensures a closing force on the valve needle which is independent of the fuel pressure.

Besides the requirements already cited, the following should optimally also be taken into consideration in the design of an improved injection valve, in particular a high-pressure injection valve for direct-injection lean-burn engines having a piezoelectric multilayer actuator (PMA) as the drive element, although the individual requirements are often in competition:

extensive retention of established structural designs;
adequate removal of heat dissipated by the actuator;
hermetic sealing of the actuator from the fuel being dosed;
a high level of mechanical flexibility, pressure resistance, and proof against leakage during continuous operation should be provided, and the seal elements should be adequately protected from high-amplitude fuel-pressure oscillations;

compensation of pressure-induced forces impacting directly on the valve needle or introduced into the valve needle by elements directly mechanically connected to the valve needle, such as the seal elements;

the hydraulic length compensation should ensure that the injection valve operates properly over the typical temperature range of −40° C. to +150° C. and should automatically compensate any thermally induced changes in length, any such changes due to settling effects on the part of the actuator, any pressure-induced changes in length, and also any length scattering due to manufacturing tolerances, in order, among other things, to allow steel, for example, instead of invar to be used as the material for production;

on the drive side it should be possible for all moving parts to be secured to their bearing by a weld so that no loss of travel occurs as a result of gaps.

SUMMARY OF THE INVENTION

The object of the present invention is to provide a dosing device which meets the described requirements profile as fully as possible and, most especially, allows the hermetic sealing and heat removal from the actuator to be optimized. The advantages of a high degree of hydraulic compressive pre-stressing should be retained and at the same time it must be possible for the optimized length compensator to be integrated into the dosing device overall in a simple manner.

Said object is achieved according to the invention by a dosing device for dosing a fluid under pressure being dosed, comprising a housing with a dosing aperture which can be controlled by displacement of a valve needle, an electromechanical actuator, whose length can be changed in the axial direction, which is located inside a working chamber of the housing, and whose two end faces are connected one to the valve needle and the other to an axially movable hydraulic piston, a hydraulic chamber hydraulically connected in a throttled manner to the working chamber by means of a first fit between the hydraulic piston and the housing, with the first fit being embodied in such a way that the hydraulic piston will retain its position relative to the housing if there is a rapid change in the length of the actuator, wherein the working chamber and the hydraulic chamber can be filled with a working fluid, the working chamber is divided by a hermetically tight separating membrane into an actuator chamber containing the actuator and a fluid chamber, the fluid chamber can be filled under pressure with the fluid being dosed, while the actuator chamber and the hydraulic chamber are filled with a hydraulic fluid as the working fluid, and wherein a base pressure can be produced in the hydraulic fluid by means of the pressure of the fluid being dosed, said pressure being transmitted through the separating membrane.

The object can also be achieved by a dosing device for dosing a fluid under pressure being dosed, comprising a housing comprising a dosing aperture which can be controlled by displacement of a valve needle, and a working chamber which is divided by a hermetically tight separating membrane into an actuator chamber filled with a hydraulic fluid and a fluid chamber which can be filled under pressure with a working fluid being dosed, wherein a base pressure can be produced in the hydraulic fluid by means of the pressure of the fluid being dosed, said pressure being transmitted through the separating membrane, an electromechanical actuator inside the actuator chamber, whose length can be changed in the axial direction, and whose first end face is connected to the valve needle and whose second end face to an axially movable hydraulic piston, and a hydraulic chamber which can be filled with the hydraulic fluid hydraulically connected in a throttled manner to the working chamber by means of a first fit between the hydraulic piston and the housing, with the first fit being embodied in such a way that the hydraulic piston will retain its position relative to the housing if there is a rapid change in the length of the actuator.

An axially soft separating membrane is provided which is connected hermetically tightly at its inside diameter to the valve needle and hermetically tightly at its outside diameter to the inner wall of the working chamber. The separating membrane can be embodied by means of a double metal bellows arrangement. The valve needle can be routed through two narrow needle ducts axially in the housing in the area between the fluid chamber and the dosing aperture. The valve needle may have flattened sections in the area of the needle duct on the side of the dosing aperture so that the fluid being dosed, which is supplied from a fluid feed, can reach the dosing aperture unimpeded. The needle duct on the fluid chamber side can be embodied so narrowly as to allow either no hydraulic link or only a highly throttling hydraulic link between the needle duct on the side of the dosing aperture and the fluid chamber. The fluid being dosed can be supplied for the purpose of pressure-filling the fluid chamber via a branch from the fluid feed to said fluid chamber. The actuator can be located inside a metal bellows which is flexible in the axial direction and is secured in a sealed manner in the area of the end face of the actuator on the side of the valve needle and on the hydraulic piston, and which divides the actuator chamber into an inner actuator chamber and an outer actuator chamber filled with hydraulic fluid. The inner actuator chamber can also be filled with hydraulic fluid. The actuator can be inserted into a Bourdon spring and can be compressively pre-stressed by this.

The working chamber is divided according to the invention by a hermetically tight separating membrane into an actuator chamber containing the actuator and a fluid chamber, with said fluid chamber being fillable under pressure with the fluid being dosed, while the actuator chamber and hydraulic chamber are filled with a hydraulic fluid as the working fluid so that a base pressure can be produced in the hydraulic fluid by means of the pressure of the fluid being dosed, said pressure being transmitted through the separating membrane.

The concept underlying the invention is accordingly based on not directly pressure-filling a working chamber, containing the actuator, with fluid to be dosed, but instead on using the pressure of the fluid to be dosed indirectly—via a pressure-transmitting separating membrane dividing the working chamber into an actuator chamber and a fluid chamber—, in order to subject a hydraulically terminated length compensation system to a very high base pressure. This first enables the hydraulic chamber to accommodate high tensile forces. This facilitates very rapid closing of the needle without the occurrence of cavitation in the hydraulic chamber due to inertial forces. The high base pressure moreover produces ideal hydraulic compressive pre-stressing of the actuator, which is to say a high force with a vanishing spring constant.

Subjecting the hydraulic compensation system according to the invention indirectly to pressure makes it possible to avoid any disadvantages of direct contact between the actuator and the fluid being dosed or, as the case may be, to gain the advantages that may ensue from surrounding the actuator with a special hydraulic fluid. The silicon oil advantageously surrounding the actuator improves the removal of the actuator's dissipated heat to the housing of the injection valve and to the cylinder head.

According to the invention the base pressure of the hydraulic fluid—mostly silicon oil—is produced virtually exclusively by means of the pressure of the fluid being dosed—mostly fuel—, said pressure being transmitted through the separating membrane. Since, accordingly, there is ideally no drop in differential pressure via the separating membrane, it can be embodied to be mechanically very flexible so that it not only performs sealing and pressure-transmitting functions. It is particularly advantageous to provide an axially soft separating membrane which is connected hermetically tightly at its inside diameter to the valve needle and hermetically tightly at its outside diameter to the inner wall of the working chamber. This can be implemented particularly simply and effectively by embodying the separating membrane as a double metal bellows arrangement.

A preferred embodiment can be achieved by routing the valve needle axially in the housing through two narrow needle ducts in the area between the fluid chamber and the dosing aperture, by the valve needle's having flattened sections in the area of the needle duct on the side of the dosing aperture so that the fluid being dosed, which is supplied from a fluid feed, can reach the dosing aperture unimpeded, by embodying the needle duct on the side of the fluid chamber so narrowly as to preclude or allow only a highly throttling hydraulic link between the needle duct on the side of the dosing aperture and the fluid chamber, and by allowing the fluid being dosed to be supplied for the purpose of pressure-filling the fluid chamber via a branch from the fluid feed to said fluid chamber. This will prevent the pressure waves caused by the rapid switching of the valve from propagating into the space above the top needle duct and there damaging, for instance, the axially soft separating membrane.

BRIEF DESCRIPTION OF THE DRAWINGS

The dosing device is explained in more detail in the exemplary embodiments below with reference to the figures of the drawing.

DETAILED DESCRIPTION OF THE PREFERRED EMBODIMENTS

Figure 1A:
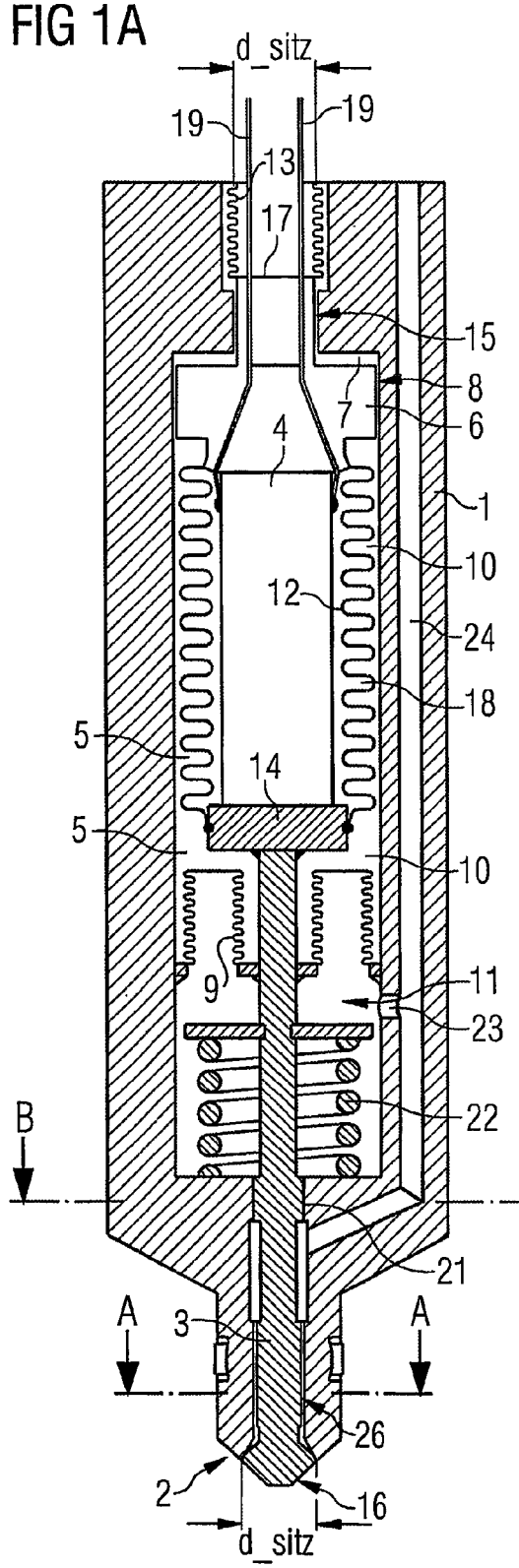
FIG. 1A shows a directly driven, outwardly opening injection valve.

FIG. 1A is a side view of a housing 1 of an injection valve in cross-section. The dosing aperture 2 is sealed by the valve needle 3; the valve needle 3 and the actuator 4 driving it are in the idle position. The actuator 4 is located within a working chamber 5 of the housing 1 and its end faces are each provided with an end cap, with the top end cap being embodied as an axially movable hydraulic piston 6. Located above the hydraulic piston 6 is the hydraulic chamber 7 which is hydraulically connected in a throttled manner by means of a first fit 8 between the hydraulic piston 6 and the housing 1 to the working chamber 5, with the first fit 8 being embodied in such a way that the hydraulic piston 6 will retain its position relative to the housing 1 if there is a rapid change in the length of the actuator 4.

The fluid chamber 11 filled with fuel is separated from the actuator chamber 10 filled with silicon oil by means of an axially soft separating membrane 9 which is connected hermetically tightly at its inside diameter to the valve needle 3 and hermetically tightly at its outside diameter to the inner wall of the working chamber 5. The separating membrane 9 should meet three conditions at the same time:

It should be embodied in such a way as to be able to readily accommodate the thermally induced changes in volume in the silicon oil in the actuator chamber—which can also lead to minor, insubstantial changes in the base pressure—by adjusting its shape. It should be sufficiently flexible to prevent any forces from being introduced into the valve needle 3 when this happens. It should furthermore be temperature-resistant and fuel-resistant. These requirements placed on the separating membrane 9 can be met in a particularly simple manner by means of the double metal bellows arrangement shown in FIG. 1A. A separating membrane 9 of this type will allow the fuel pressure to be transmitted to the silicon oil in the actuator chamber 10 without loss.

The high base pressure in the length compensation system, corresponding substantially to the fuel pressure, is advantageous in numerous respects. Any gas bubbles that may be entrapped in the hydraulic chamber 7 when the injection valve is filled with silicon oil will be compressed thereby to such an extent that they can no longer adversely affect the rigidity of said hydraulic chamber 7. The fuel pressure in the silicon oil will also ensure sufficiently high compressive pre-stressing in the actuator 4 as the hydraulic compressive pre-stressing will, where applicable, be added to the mechanical compressive pre-stressing due, for example, to a metal bellows 12. Hydraulic compressive pre-stressing is calculated as the difference between the hydraulically effective cross-section of the metal bellows 12 toward the actuator seal and the hydraulically effective surface of the top metal bellows lead-through 13 or, as the case may be, of the needle seal seating and, in the case of typical fuel pressures up to 250 bar, can be up to 3000 N. Commercially available serially produced bellows, in particular of type BE 39510 from the company Witzenmann, will substantially meet the requirements placed on an actuator seal.

The actuator unit consists of a piezoelectric multilayer actuator (PMA) 4 which is hermetically sealed between a top and a bottom end cap 14 and welded under mechanical compressive pre-stressing into a metal bellows 12 surrounding it. Apart from a multilayer piezoelectric actuator, any other type of solid-state actuator, for example a magnetostrictive actuator or an electrostrictive actuator, can also be advantageously used as the valve drive. The method known per se of operating the dosing device according to the invention is based on extending the actuator 4 in the axial direction so rapidly through the application of an electrical signal that it will be supported against the hydraulic chamber 7, and on the valve needle's 3 being lifted from the dosing aperture 2 through said extending of the actuator 4 so that fluid can be fed in a controlled manner from the dosing aperture 2. To terminate the dosing process the actuator is discharged and contracted at least by the tensile stress of the metal bellows 12 and the hydraulic compressive pre-stressing provided by the base pressure in the actuator chamber 10, as a result of which the valve needle 3 is reseated, externally sealed, onto the dosing aperture 2 and fluid feeding is terminated.

The top end cap is embodied as a stepped hydraulic piston 6 which, jointly with the housing 1, limits the hydraulic chamber 7. Double guiding in the form of two narrow snug fits 8 and 15 seals the hydraulic chamber 7 in the form of highly throttling fluidic links. The top fit 15 having as small a diameter as possible seals the hydraulic chamber 7 against the space containing the top metal bellows lead-through 13. The bottom fit having as large a diameter as possible seals the hydraulic chamber 7 in the downward direction against the volume of the actuator chamber 10. The annular area between the small and large fit diameters corresponds to the hydraulically effective area of the hydraulic piston. The rigidity $c_K$ of the hydraulic chamber 7 is calculated from the compressibility k of the silicon oil, the effective piston area $a_K$, and the chamber height $h_K$, according to the following formula:

$$c_K = a_K/k \cdot h_K.$$

It is clear from this that a large effective piston area and a small chamber height will result in a high degree of chamber rigidity. Typically achievable rigidity values for this type of hydraulic chamber 7 far exceed 100 N/μm.

The top metal bellows lead-through 13, which is secured in a hermetically sealed manner, in each case by means of a weld, at its bottom end above the top narrow snug fit 15 to the top end cap (hydraulic piston 6) and at its top end to the housing 1, seals the silicon oil under fuel pressure against the exterior space. Relative movements between the top end cap and the housing 1 are not impeded by the metal bellows 13. The hydraulically effective diameter of the top metal bellows lead-through 13 is selected to be the same as the sealing diameter of the conically seated valve 16 ($d_{sitz}$) formed from the bottom end of the valve needle 3 and the housing 1. What is achieved thereby is that all axially effective pressure forces are mutually compensated over the totality of the parts that move relative to the housing (the valve needle 3 and the actuator unit with the top end cap 6) which are subjected to fuel pressure through the fuel and the silicon oil under fuel pressure, and that no resulting axial force occurs between the housing 1 and the moving parts.

Since on the one hand the top end surface 17 of the top end cap 6 directly borders the external space through the top metal bellows lead-through 13 and, on the other hand, a bottom end surface of the top end cap 6 faces the actuator 4 in the inner actuator chamber 18, which is hermetically sealed against the silicon oil, of the metal bellows 12, the electrical terminals 19 of the actuator 4 can simply be led out from the actuator 4 to the external space through bore holes in the end cap 6.

Figure 1B:
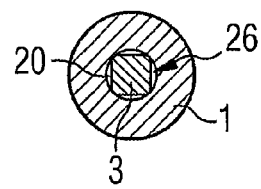
FIG. 1B is a cross-section along the line A-A in FIG. 1A.
Figure 1C:
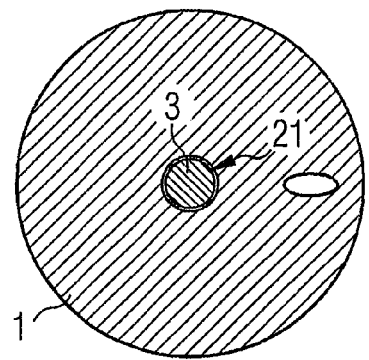
FIG. 1C is a cross-section along the line B-B in FIG. 1A.

The valve needle 3 is rigidly connected to the bottom end cap 14 of the actuator unit by means of, for instance, a weld. Said valve needle 3 is routed axially in the housing 1 through two narrow fits. In the area of the bottom needle duct 26 (section A-A), see FIG. 1B, the valve needle fit has flattened sections 20 so that the fuel being fed in can reach the conical seal seating 16 unimpeded. The top needle duct 21 (section B-B), see FIG. 1C, can, by contrast, be embodied as fully cylindrical since the fuel flowing toward the conical seal seating 16 during injection does not have to pass through this section. It is even desirable to embody the top needle duct 21 to be highly throttling for the fuel since this will prevent the pressure waves caused by the rapid switching of the valve from propagating into the space above the top needle duct 21 and damaging, for instance, the axially soft separating membrane 9. The fluid chamber 11, on the other hand, can advantageously be subjected under pressure to fuel through a branch 23 from the fluid feed 24.

When the injection valve is in the idle state, the conically seated valve 16 formed from the bottom valve needle end and the bottom end of the housing 1 is kept closed by means of a needle-resetting spring 22 supported on one side against the housing 1 and on the other against the valve needle 3.

The overall result is a dosing device further having the following advantages:

A simple physical design for the hydraulic condenser using a small number of functional components is just as possible as perfect compensating of the static pressure forces. The pressure in the actuator chamber 10 does not reduce the pressure on the valve seat. The inner actuator chamber 18 can possibly also be filled with silicon oil for improved removal of dissipated heat. The top metal bellows lead-through 13 at which the full difference in pressure drops from that of the fuel to that of the surrounding area, is multiply decoupled by means of narrow snug fits from the pressure waves which are generated on the conical seating during the injection process by rapid opening and closing and which can subject the metal bellows to high stresses. Nor is said lead-through subjected to the alternating stresses due to movements of the valve needle. It only compensates relative movements between the top housing section and the top end cap 6 due to, for instance, changes in temperature or in fuel pressure. Although the separating membrane 9 is exposed to the alternating stresses due to movements of the valve needle, it is not subjected to any stresses due to differences in pressure. As already mentioned, the electrical terminals 19 can be conveniently led out through the end cap 6 without any high-pressure sealing.

Figure 2:
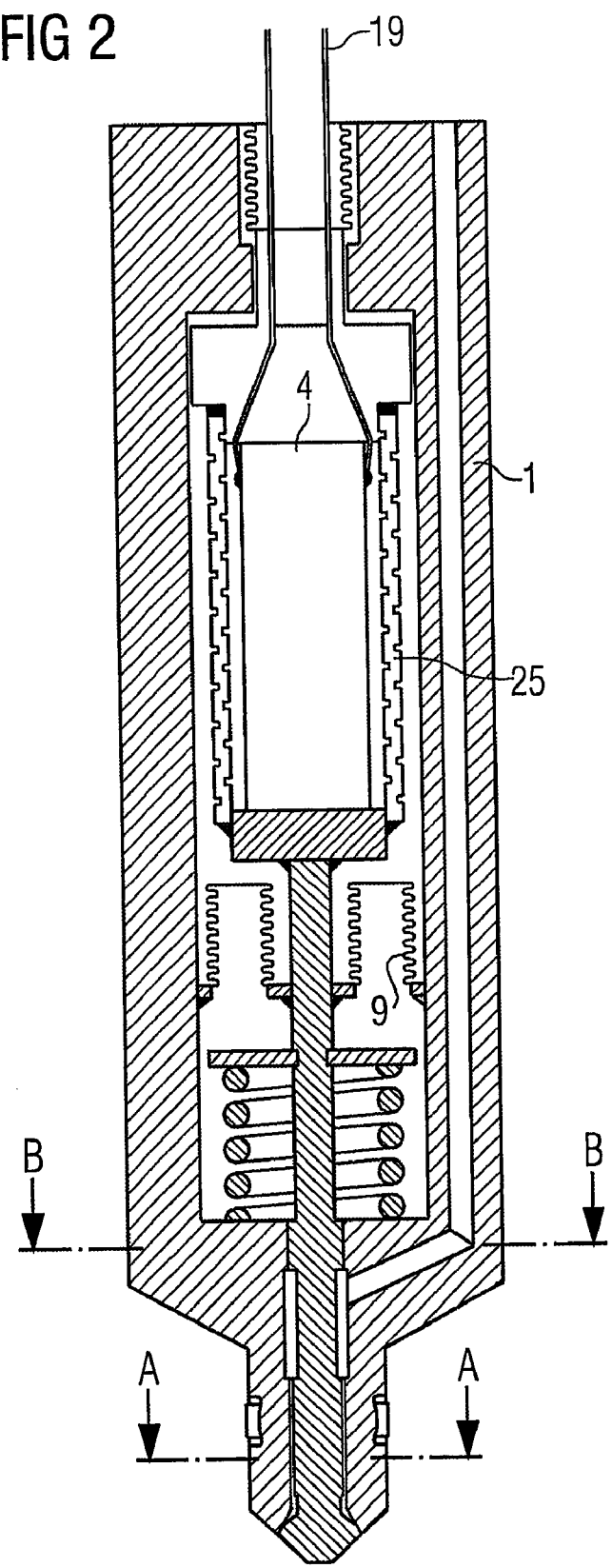
FIG. 2 shows a further embodiment of the injection valve according to FIG. 1A.

FIG. 2 shows an embodiment of the dosing device according to the invention having a Bourdon spring 25, known per se, into which the actuator 4 is inserted and by which said actuator is compressively pre-stressed (independently of the fuel pressure). The Bourdon spring 25 in this case accordingly replaces the metal bellows 12. However, in this embodiment the terminals 19 have to be led out provided with high-pressure sealing. The heat dissipated by the actuator 4 can, however, be advantageously removed in a substantially further improved manner. Moreover, silicon oils also possess spark-quenching properties benefiting the voltage endurance of the actuator 4, which is operated at field strengths of up to 2 KV/mm.

The pre-stressing force is for the most part substantially less than in a hydraulic system, resulting in reduced electrical energy and power consumption by the actuator during switching.

We claim:

1. A dosing device for dosing a fluid under pressure being dosed, comprising:
   a housing with a dosing aperture which can be controlled by displacement of a valve needle,
   an electromechanical actuator, whose length can be changed in the axial direction, which is located inside a working chamber of the housing, and whose two end faces are connected one to the valve needle and the other to an axially movable hydraulic piston,
   a hydraulic chamber hydraulically connected in a throttled manner to the working chamber by means of a first fit between the hydraulic piston and the housing, with the first fit being embodied in such a way that the hydraulic piston will retain its position relative to the housing if there is a rapid change in the length of the actuator, wherein
   the working chamber and the hydraulic chamber can be filled with a working fluid, the working chamber is divided by a hermetically tight separating membrane into an actuator chamber containing the actuator and a fluid chamber, the fluid chamber can be filled under pressure with the fluid being dosed, while the actuator chamber and the hydraulic chamber are filled with a hydraulic fluid as the working fluid, and wherein a base pressure can be produced in the hydraulic fluid by means of the pressure of the fluid being dosed, said pressure being transmitted through the separating membrane, the valve needle is routed through two narrow needle ducts axially in the housing in the area between the fluid chamber and the dosing aperture, the valve needle has flattened sections in the area of the needle duct on the side of the dosing aperture so that the fluid being dosed, which is supplied from a fluid feed, can reach the dosing aperture unimpeded, the needle duct on the fluid chamber side is embodied so narrowly as to allow either no hydraulic link or only a highly throttling hydraulic link between the needle duct on the side of the dosing aperture and the fluid chamber, and the fluid being dosed can be supplied for the purpose of pressure-filling the fluid chamber via a branch from the fluid feed to said fluid chamber.

2. The dosing device according to claim 1, wherein an axially soft separating membrane is provided which is connected hermetically tightly at its inside diameter to the valve needle and hermetically tightly at its outside diameter to an inner wall of the working chamber.

3. The dosing device according to claim 2, wherein the separating membrane is embodied by means of a double metal bellows arrangement.

4. The dosing device according to claim 1, wherein the actuator is located inside a metal bellows which is flexible in the axial direction and is secured in a sealed manner in the area of the end face of the actuator on the side of the valve needle and on the hydraulic piston, and which divides the actuator chamber into an inner actuator chamber and an outer actuator chamber filled with hydraulic fluid.

5. The dosing device according to claim 1, wherein the actuator is inserted into a Bourdon spring and is compressively pre-stressed by this.

6. A dosing device for dosing a fluid under pressure being dosed, comprising:

a housing with a dosing aperture which can be controlled by displacement of a valve needle, an electromechanical actuator, whose length can be changed in the axial direction, which is located inside a working chamber of the housing, and whose two end faces are connected one to the valve needle and the other to an axially movable hydraulic piston, a hydraulic chamber hydraulically connected in a throttled manner to the working chamber by means of a first fit between the hydraulic piston and the housing, with the first fit being embodied in such a way that the hydraulic piston will retain its position relative to the housing if there is a rapid change in the length of the actuator, wherein the working chamber and the hydraulic chamber can be filled with a working fluid, the working chamber is divided by a hermetically tight separating membrane into an actuator chamber containing the actuator and a fluid chamber, the fluid chamber can be filled under pressure with the fluid being dosed, while the actuator chamber and the hydraulic chamber are filled with a hydraulic fluid as the working fluid, and wherein a base pressure can be produced in the hydraulic fluid by means of the pressure of the fluid being dosed, said pressure being transmitted through the separating membrane wherein the actuator is located inside a metal bellows which is flexible in the axial direction and is secured in a sealed manner in the area of the end face of the actuator on the side of the valve needle and on the hydraulic piston, and which divides the actuator chamber into an inner actuator chamber and an outer actuator chamber filled with hydraulic fluid the inner actuator chamber is also filled with hydraulic fluid.

7. The dosing device according to claim 6, wherein the actuator is inserted into a Bourdon spring and is compressively pre-stressed by this.

8. The dosing device according to claim 6, wherein the valve needle is routed through two narrow needle ducts axially in the housing in the area between the fluid chamber and the dosing aperture.

9. The dosing device according to claim 6, wherein the valve needle has flattened sections in the area of a needle duct on a side of the dosing aperture so that the fluid being dosed, which is supplied from a fluid feed, can reach the dosing aperture unimpeded.

10. The dosing device according to claim 6, wherein a needle duct on the fluid chamber side is embodied so narrowly as to allow either no hydraulic link or only a highly throttling hydraulic link between a needle duct on the side of the dosing aperture and the fluid chamber.

11. The dosing device according to claim 6, wherein the fluid being dosed can be supplied for the purpose of pressure-filling the fluid chamber via a branch from a fluid feed to said fluid chamber.

12. A dosing device for dosing a fluid under pressure being dosed, comprising:

a housing comprising a dosing aperture which can be controlled by displacement of a valve needle, and a working chamber which is divided by a hermetically tight separating membrane into an actuator chamber filled with a hydraulic fluid and a fluid chamber which can be filled under pressure with a working fluid being dosed, wherein a base pressure can be produced in the hydraulic fluid by means of the pressure of the fluid being dosed, said pressure being transmitted through the separating membrane;

an electromechanical actuator inside the actuator chamber, whose length can be changed in the axial direction, and whose first end face is connected to the valve needle and whose second end face to an axially movable hydraulic piston, and a hydraulic chamber which can be filled with the hydraulic fluid hydraulically connected in a throttled manner to the working chamber by means of a first fit between the hydraulic piston and the housing, with the first fit being embodied in such a way that the hydraulic piston will retain its position relative to the housing if there is a rapid change in the length of the actuator, wherein the valve needle is routed through two narrow needle ducts axially in the housing in the area between the fluid chamber and the dosing aperture.

13. The dosing device according to claim 12, Wherein the separating membrane is axially soft and is connected hermetically tightly at its inside diameter to the valve needle and hermetically tightly at its outside diameter to the inner wall of the working chamber.

14. The dosing device according to claim 13, wherein the separating membrane is embodied by means of a double metal bellows arrangement.

15. The dosing device according to claim 12, wherein the valve needle has flattened sections in the area of the needle duct on the side of the dosing aperture so that the fluid being dosed, which is supplied from a fluid feed, can reach the dosing aperture unimpeded.

16. The dosing device according to claim 15, wherein the needle duct on the fluid chamber side is embodied so narrowly as to allow either no hydraulic link or only a highly throttling hydraulic link between the needle duct on the side of the dosing aperture and the fluid chamber.

17. The dosing device according to claim 16, wherein the fluid being dosed can be supplied for the purpose of pressure-filling the fluid chamber via a branch from the fluid feed to said fluid chamber.

18. The dosing device according to claim 12, wherein the actuator is located inside a metal bellows which is flexible in the axial direction and is secured in a sealed manner in the area of the end face of the actuator on the side of the valve needle and on the hydraulic piston, and which divides the actuator chamber into an inner actuator chamber and an outer actuator chamber filled with hydraulic fluid.

19. The dosing device according to claim 12, wherein the actuator is inserted into a Bourdon spring and is compressively pre-stressed by this.

20. A dosing device for dosing a fluid under pressure being dosed, comprising:
a housing comprising a dosing aperture which can be controlled by displacement of a valve needle, and a working chamber which is divided by a hermetically tight separating membrane into an actuator chamber filled with a hydraulic fluid and a fluid chamber which can be filled under pressure with a working fluid being dosed, wherein a base pressure can be produced in the hydraulic fluid by means of the pressure of the fluid being dosed, said pressure being transmitted through the separating membrane;

an electromechanical actuator inside the actuator chamber, whose length can be changed in the axial direction, and whose first end face is connected to the valve needle and whose second end face to an axially movable hydraulic piston, and a hydraulic chamber which can be filled with the hydraulic fluid hydraulically connected in a throttled manner to the working chamber by means of a first fit between the hydraulic piston and the housing, with the first fit being embodied in such a way that the hydraulic piston will retain its position relative to the housing if there is a rapid change in the length of the actuator, wherein the actuator is located inside a metal bellows which is flexible in the axial direction and is secured in a sealed manner in the area of the end face of the actuator on the side of the valve needle and on the hydraulic piston, and which divides the actuator chamber into an inner actuator chamber and an outer actuator chamber filled with hydraulic fluid, wherein the inner actuator chamber is also filled with hydraulic fluid.

* * * * *